United States Patent Office 3,227,768
Patented Jan. 4, 1966

3,227,768
HYDROGENATION PROCESS
Edward L. Cole, Fishkill, Edwin C. Knowles, Poughkeepsie, and Ernest A. Naragon, Hawthorne, N.Y., assignors to Texaco Inc., New York, N.Y., a corporation of Delaware
No Drawing. Filed Sept. 20, 1962, Ser. No. 225,152
8 Claims. (Cl. 260—667)

This invention relates to the hydrogenation of unsaturated organic materials and more particularly to the catalytic hydrogenation of olefinic or aromatic hydrocarbons. In one of its more specific aspects the present invention relates to the catalytic hydrogenation of aromatic hydrocarbons such as benzene, toluene and/or naphthalene.

Catalytic hydrogenation of hydrocarbons is known in the art, and may be carried out over a wide range of operating conditions. For example, temperatures of from about 400° F. to 800° F. and pressures of from about 300 to 10,000 p.s.i.g. may be used. Thus, for example, hydrogenation of a lubricating oil carried out in the presence of hydrogen and a suitable catalyst, may be conducted under relatively mild conditions for the purpose of improving the color characteristics of the lubricating oil. On the other hand, more severe conditions may be employed where it is desirable to effect the hydrogenation of the feed charge or where it is desirable to crack out unsuitable components. Still further, hydrogenation may be employed to remove oxygen, nitrogen and sulfur constituents from petroleum fractions.

During catalytic processing with solid particulate catalyst, the reactants are passed through a bed of porous catalyst particles, beads or pellets. In many such reactions employing organic materials at elevated temperatures, a carbonaceous deposit accumulates on the catalyst surface and in the pores and openings of the catalyst as the process proceeds under continuous operating conditions. This deposition of carbonaceous material, commonly known as fouling of the catalyst, is a function of the reactants, the reaction conditions and the catalyst and certain types of reactions may be worse offenders than others. Fouling may be particularly excessive when the reactants or products remain in contact with the catalist for a relatively long time or at relatively high temperatures. When a porous catalyst is used, the reactants diffuse into the interior or central portion of the catalyst particle and may be retained for an excessive period of time whereupon decomposition of the reactants and products results in fouling of the catalyst. Fouling causes not only a decrease in catalyst activity and loss in selectivity, but also causes intensification of the heat transfer problem in the catalyst bed with the resultant local overheating or "hot spots," particularly during regeneration of the catalyst.

The catalyst bed, customarily provided in a composite form comprising an active component supported by a carrier, is generally a relatively poor conductor of heat. Temperature control may be particularly difficult in a conventional packed column or fixed bed reactor where each layer of catalyst is, in effect, partially insulated from adjacent layers. Heat carriers or heat conductive materials have been proposed as one means of reducing temperature gradients in a catalyst bed. For carrying out some highly exothermic or highly endothermic reactions, it has been proposed to incorporate pieces of metal or other suitable heat conductive solid material in the fixed catalyst bed to facilitate heat transfer to the surroundings. Attempts to achieve heat transfer and temperaure conrol of the catalyst bed have been made by employing a gaseous or liquid heat-transfer medium usually circulated through a jacket surrounding the reactor. The reactants may be diluted with steam or an inert gas as a further means of achieving temperature control. However, the known or proposed methods regarding thermal control necessitate especially designed reactors, and further may require materials and equipment in addition to that normally employed.

The problems of the prior art hydrogenation processes are exemplified in the hydrogenation of benzene to cyclohexane, a highly exothermic reaction. In the processes of the prior art, benzene is mixed with cyclohexane and a stoichiometric excess of hydrogen and the mixture is passed through a bed of hydrogenation catalyst at a temperature between about 400 and 500° F. and a pressure between about 300 and 700 p.s.i.g. Ordinarily the cyclohexane acting as an inert diluent to absorb the exothermic heat of reaction. When such a large amount of inert material or product is introduced into the catalytic reaction zone, as for example in the case of cyclohexane being added to the benzene, approximately four times as much material is introduced into the reaction zone as is being converted into final product. This results in the use of a catalytic chamber which is approximately four times larger than would be necessary if no diluent was added to the feed. This in turn causes a considerable increase in construction costs as a large pressure-resistant vessel is of much heavier construction than a small pressure-resistant vessel.

It is an object of the present invention to carry out exothermic reactions without the addition of an inert diluent to maintain temperature control. Another object of the invention is to carry out the catalytic hydrogenation of unsaturated organic materials without the recycle of hydrogenation product. Another object of the invention is to catalytically hydrogenate an aromatic compound on a "once through" basis. Another object of the invention is to produce substantially pure cyclohexane from substantially pure benzene. A still further object of the present invention is to catalytically hydrogenate aromatic hydrocarbons using a catalytic reactor proportionately smaller than those used in the process of the prior art. A still further object of the invention is to convert benzene to substantially pure cyclohexane free from isomerization products.

These and other objects which will be obvious to those skilled in the art from the following description are accomplished by the process of the present invention in which an unsaturated organic material is hydrogenated by being passed with hydrogen through a first elongated reaction zone having its inner walls coated with a hydrogenation catalyst and the effluent from the first reaction zone is passed through a second reaction zone containing a fixed bed of hydrogenation catalyst.

The first reaction zone is elongated or tubular in form and has a catalytic coating artificially deposited on its inner surface. Advantageously the reaction zone is formed from a metal tube having a metal oxide integrally associated therewith and having a hydrogenation catalyst deposited on the metal oxide.

The metal substrate which is employed in the catalytic structure is first provided with an adherent oxide film, preferably a relatively porous and adsorbent oxide film, which serves as the catalyst carrier. Metals found most useful and susceptible of rendering the desired oxide film include those selected from the group consisting of aluminum, tantalum, titanium, zirconium and hafnium, and more preferably aluminum, tantalum and titanium. As used herein, the term "metal" is intended to include a pure metal, a commercial metal containing the usual impurities and a base alloy of the metal.

The oxide film may be produced by any of several known methods, including chemical and electro-chemical methods, but must be of sufficient thickness to provide adequate adsorptive capacity for retaining the catalyst deposit. To insure adequate performance under the conditions encountered in catalytic processing, however, the artifically produced oxide film generally should not be substantially thinner than about 0.1 mil, and preferably not less than about 0.5 mil, usually about 0.5 to 1 mil being desirable. Where an aluminum metal substrate is employed, for example, the oxide film may be produced by treating the aluminum surface with a solution of an alkaline carbonate, usually a sodium carbonate-chromate solution.

The film may also be produced by the anodic oxidation of the metal surface whereby the metal is made the anode in an electrolytic solution. In anodizing aluminum, a 15% sulfuric acid solution is commonly employed as the electrolyte, but other acid electrolytes such as chromic acid, oxalic acid, phosphoric acid and sometimes boric acid may be used. Titanium, tantalum, hafnium and zirconium may be anodized advantageously in a boric acid-ammonia solution having a pH of about 8. The oxide film to which reference is made here is produced by artificial means and does not include relatively thin natural oxide films occurring on metal surfaces which have been exposed to an oxygen-containing atmosphere.

Anodic films, and more especially aluminum surfaces having an anodically produced film are particularly suitable for use as catalyst carriers in the process of the present invention. Oxide films formed by this well-known commercial method are relatively porous and adsorbent, and although this constitutes a preferred embodiment, it should be understood that other conversion films, including barrier type films, are also useful in the preparation of the catalyst structure.

The method utilized in depositing the catalyst material upon the oxide film is dependent to some extent upon the particular catalyst material employed. In one method, the catalyst material is deposited by chemically reducing a solution containing a soluble compound of the catalyst material in the presence of the metal substrate bearing the oxide film under such conditions as to effect a substantially uniform deposition of the catalyst material upon the oxide surface. Although the exact form of the deposit of catalyst material is deposited from solution as elemental metal or as an intermeidate product of reduction. Chemical reduction of the deposit is particularly useful in those instances where the elemental metal or its intermediate product of reduction exhibits the required catalytic activity, or where a deposit of the metal may be rendered active by subsequent treatment. In several cases, a compound of the metal forms with a stabilizing agent a soluble complex which may be readily reduced to the elemental metal or its intermediate product of reduction with a suitable reducing agent, preferably a reducing gas, for example, hydrogen. Suitable stabilizing agents include complexing agents which form soluble complex ions of the co-ordinate complex type, sequestering agents, chelating agents, dispersants and detergents. Thus, compounds or salts of numerous metals form with ammonia, for example, a co-ordination type complex. These metals usually include those from Groups I, VI and VIII of the Periodic Table of Elements, for example, copper, silver, gold, chromium, molybdenum, tungsten, iron, cobalt, nickel, platinum, palladium, osmium and iridum, but also may embrace other elements including those from Groups II, III, IV, V and VII of the Periodic Table, for example, zinc, cadmium, mercury, tin, zirconium, vanadium, manganese, and combinations thereof. Among these are included many known and useful hydrogenation catalysts. The deposit is generally calcined and activated by subsequent treatment as, for example, by reducing, oxidizing or sulfiding the catalyst metal or metals.

The non-metallic ion or the anion of the metal compound or salt may be of any inorganic acid or strong organic acid which forms a soluble salt of the metal and is not reduced under catalyst deposition conditions. Those inorganic anions usually employed include sulfate, chloride, nitrate, carbonate, chromate and vanadate, and the organic anion preferably is the acetate. The solvent generally used is water, but suitable organic solvents, including alcohols, aldehydes, ethers, ketones, toluene and pyridine may be used, as may liquid ammonia.

Although ammonia is the preferred stabilizing agent, other suitable stabilizing agents include the organic primary, secondary and tertiary amines such as methyl amine, ethylenediamine and diethylene triamine. In addition, stabilizing agents may include phosphates, especially pyrophosphate and metaphosphate, as well as citrates, acetates, oxalates, tartrates, o-phenanthroline, thiocyanates, thiosulfates, thiourea, pyridine, quinoline and cyanates. Still further useful complex formations include the chloro, hydroxo and aquo complexes, such as the aquo-ammonia complexes. Olefin and olefin-like compounds are also useful, and may include, for example, ethylene, propylene, butadiene, etc., as well as unsaturated cyclic compounds such as cyclohexene and styrene. However, the olefin and olefin-like compounds are desirably employed in a non-aqueous solvent, for example, benzene, toluene, pyridine, acetone and ether.

The catalyst material may be deposited on the oxide film by the action of a reducing agent, preferably hydrogen, on a solution containing a soluble complex of the catalyst material, such as an ammoniacal solution of a salt of the catalyst material. The temperature and pressure employed in the reducing step depend upon the material undergoing reduction and may vary over a wide range. Thus, for example, platinum may be deposited from ethylene chloroplatinate in benzene by reduction with hydrogen at room temperature and atmospheric pressure. However, with numerous other metals, reduction proceeds advantageously at elevated temperatures which may range up to 500° F. and under a partial pressure of as high as 4000 pounds per square inch or higher. To effect a substantially uniform, adherent deposit of the catalyst material upon the oxide film of a metal substrate of extended surface area, it is especially desirable that reduction and deposition proceed under a substantially quiescent condition, or at least in a system substantially free from turbulence. It should be understood that other reducing gases such as carbon monoxide may be used with satisfactory results, as may other reducing agents such as hydrazine, hydroxylamine, glyoxal, formaldehyde of sulfur dioxide.

By way of example, a deposit of nickel or molybdenum or their oxides may be formed on the oxide film of the substrate from an ammoniacal solution of a salt containing the metal by reducing the solution with hydrogen at elevated temperature and pressure. The deposit may then be sulfided with hydrogen sulfide gas at elevated temperature and the sulfide catalyst formed then may be used in the hydrogenation of hydrocarbons. A mixture of metal salts, all of which form complex ions with ammonia, may be used for forming a deposit of more than one catalytic element. By such means, a nickel-molybdenum catalyst or cobalt-molybdenum-nickel catalyst may be deposited on the oxide film for use as a hydrogenation catalyst. Also, nickel-molybdenum or nickel-tungsten salts may be complexed in a citrate solution and precipitated from solution with hydrogen as described above. The co-deposits may then be calcined or otherwise activated.

The reaction conditions in the first reaction zone will vary depending upon the type of starting material and the type of reaction it is desired to effect. For example, if the feed is a material such as an unsaturated fatty oil and the intended product is a saturated fatty oil, the reaction conditions will be relatively mild and the temperature will range from about 200 to 450° F. If the starting material is an aromatic hydrocarbon such as benzene and the intended product is cyclohexane intermediate reaction will be used and the temperature will range from about 450 to 750° F. However, if it is desired to destructively hydrogenate a heavy hydrocarbon this severe type of reaction will require a temperature of about 800 to 1000° F. or even higher. It will also be appreciated that the severity of the reaction will determine the operating pressure which generally will range between about 100 and 10,000 p.s.i.g.

The space velocity is determined to a large extent by the other reaction conditions such as temperature and pressure. At higher temperatures usually high space velocities are used and conversely at lower temperatures lower space velocities are used for reactions of intermediate severity. However, severe reaction conditions call for high temperature, high pressures and low space velocities, whereas mild reaction conditions call for low temperatures, low pressures and high space velocities. The space velocity on an hourly weight basis ranges between 5 and 200. The space velocity on an hourly volume basis empty tube ranges between 1 and 100. Hydrogen naturally is introduced in stoichiometric excess. Advantageously the mol ratio of hydrogen to feed will be at least 1.5 to 1, preferably at least 3 or 4 to 1.

The partially saturated effluent from the first reaction zone in whole or in part is then introduced into the second reaction zone. The second reaction zone contains a bed of particulate catalyst which latter is in the form of pellets, cylinders or spheres having a minimum dimension of not less than about 1/16 of an inch and a maximum dimension of not greater than about 1/2 inch. The particulate catalyst generally comprises a hydrogenating component supported on an inert base. Suitable hydrogenating components are the elements or compounds of elements of Group VI or Group VIII of the periodic system and mixtures thereof, for example chromium, molybdenum, tungsten, iron, cobalt, nickel, ruthenium, rhodium, palladium, platinum or their oxides or sulfides. Suitable supports include magnesia, silica, alumina, zirconia, and mixtures thereof. The temperature in the second reaction zone will range from about 100 to 1000° F. generally between about 200 and 800° F. Atmospheric pressures of from atmospheric to 2,000 p.s.i.g. may be used, pressures of from 100 to 1000 p.s.i.g. being preferred. The volumetric hourly space velocity, that is volumes of normally liquid feed per hour per volume of catalyst, should be between 0.5 and 20 preferably between 1 and 5. When the organic feed to the process is substantially pure, the entire effluent from the first reaction zone may be passed, advantageously with cooling, to the second reaction zone. However, if the said feed to the first reaction zone contains impurities which would form materials to which the catalyst of the second reaction zone is sensitive advantageously these catalyst poisons are removed prior to passing the reactants into the second reaction zone. For example, if the feed to the first reaction zone contains thiophene-contaminated benzene which latter would be converted to hydrogen sulfide in the first reaction zone and if the second reaction zone contains a palladium catalyst which is poisoned by sulfur, then the hydrogen sulfide should be removed from the first reaction zone prior to introducing the reactants into contact with the palladium catalyst in the second reaction zone. This removal could be effected in several ways as by separating the effluent from the first reaction zone into a normally gaseous stream and scrubbing the gaseous stream with an amine such as diethanolamine or by contacting the gaseous stream with a 4 A. or 5 A. molecular sieve. The purified hydrogen then may be introduced with the partially saturated intermediate reaction product into the second reaction zone. When the original feed contains sulfur, it is advisable to use a sulfur-resistant catalyst such as cobalt molybdate, nickel tungsten sulfide, rhodium sulfide or the like in the first reaction zone.

The following examples serve to illustrate the process of the present invention.

EXAMPLE I

In this example, the reaction zone is a titanium tube oxidized in a water-hydrogen atmosphere, then hydroplated with nickel-tungsten and conditioned by heating in a flowing stream of hydrogen for five hours at 600° F. and 1000 p.s.i.g. The film is sulfided with benzene saturated with $H_2S$ at 550° F. and 3000 p.s.i.g. for 11 hours. The feed is pure benzene. The catalyst in the second reaction zone is a pelleted nickel oxide on silica-alumina containing 49 percent by weight nickel oxide. The following table shows the reaction conditions and gives an analysis of the intermediate and final reaction products.

*Table I*

Process conditions, first reaction zone:
    Reactor, temp. °F. _____ 650
    Pressure, p.s.i.g. _____ 3000
    Space velocity, wt./wt./hr. _____ 14.6
    Space velocity, v./v./hr. _____ 1.7
    Excess hydrogen, mols $H_2$/mol $C_6H_6$ charged_ 1.07
Intermediate reaction product:
    Cyclohexane, wt. percent _____ 24.8
    Benzene, wt. percent _____ 74.9
    Methylcyclopentane, wt. percent _____ 0.2
    Hexane, wt. percent _____ 0.1
Process conditions, second reaction zone:
    Reactor, temp. °F. _____ 380–390
    Pressure, p.s.i.g. _____ 500
    Space velocity, vol./vol./hr. _____ 1.0
Final product:
    Benzene, wt. percent _____ —
    Cyclohexane, wt. percent _____ 99.8
    Methylcyclopentane, wt. percent _____ 0.2
    Other hydrocarbons, wt. percent _____ —

EXAMPLE II

In this example, the first reaction zone is a titanium tube oxidized in a water-hydrogen atmosphere, then hydroplated with nickel molybdenum and conditioned by heating in a flowing stream of hydrogen for five hours at 600° F. and 1,000 p.s.i.g. The film is then sulfided with benzene saturated with $H_2S$ at 550° F. and 3,000 p.s.i.g. for 11 hours. The feed is pure benzene. The catalyst in the second reaction zone is a pelleted nickel oxide on silica-alumina containing 49% by weight nickel oxide. The following table shows the reaction conditions and gives an analysis of the intermediate and final reaction products.

*Table II*

Process conditions, first reaction zone:
    Reactor, temp. °F. _____ 653
    Pressure, p.s.i.g. _____ 4000
    Space velocity, wt./wt./hr. _____ 9.5
    Excess hydrogen, mols/mol $C_6H_6$ charged____ 0.6
    Space velocity, v./v./hr. _____ 1.1
Intermediate reaction product:
    Cyclohexane, wt. percent _____ 35.8
    Benzene, wt. percent _____ 64.1
    Methylcyclopentane, wt. percent _____ <0.1
    Hexanes, wt. percent _____ —
Process conditions, second reaction zone:
    Reactor, temp. °F. _____ 300–390
    Pressure, p.s.i.g. _____ 500
    Space velocity, vol./vol./hr. _____ 1.2
Final product:
    Benzene, wt. percent _____ —
    Cyclohexane, wt. percent _____ 99.9
    Methylcyclopentane, wt. percent _____ 0.1
    Other hydrocarbons, wt. percent _____ —

EXAMPLE III

In this example the first reaction zone is an aluminum tube which has been anodized then hydroplated with rhodium and conditioned by heating in a flowing stream of hydrogen for five hours at 600° F. and 1,000 p.s.i.g. The reduced film is then sulfided with benzene, saturated with $H_2S$ at 550° F. and 3,000 p.s.i.g. for 15 hours. As in Example II the feed is 100% benzene and the catalyst in the second reaction zone is nickel oxide on silica alumina containing 49% by weight nickel oxide. The following table shows the reaction conditions and gives an analysis of the intermediate and final reaction products.

*Table III*

Process conditions, first reaction zone:

| | |
|---|---|
| Reactor, temp. °F. | 600 |
| Pressure, p.s.i.g. | 3100 |
| Space velocity, wt./wt./hr. | 9.5 |
| Excess hydrogen, mols $H_2$/mol $C_6H_6$ charged | 0.52 |
| Space velocity, v./v./hr. | 1.64 |

Intermediate reaction product:

| | |
|---|---|
| Cyclohexane, wt. percent | 43.0 |
| Benzene, wt. percent | 56.9 |
| Methylcyclopentane, wt. percent | <0.1 |
| Hexanes, wt. percent | — |

Process conditions, second reaction zone:

| | |
|---|---|
| Reactor temp. °F. | 350–390 |
| Pressure, p.s.i.g. | 500 |
| Space velocity, vol./vol./hr. | 1.2 |

Final product:

| | |
|---|---|
| Benzene, wt. percent | — |
| Cyclohexane, wt. percent | 99.8 |
| Methylcyclopentane, wt. percent | 0.1 |
| Other hydrocarbons, wt. percent | 0.1 |

We claim:

1. A process for the hydrogenation of aromatic hydrocarbons which comprises passing a mixture comprising an aromatic hydrocarbon and a stoichiometric excess of hydrogen at an elevated temperature and pressure through an elongated tubular first reaction zone having a film of hydrogenation catalyst deposited on the inner surface thereof to produce a partially hydrogenated intermediate reaction product and passing at least a portion of said intermediate reaction product with excess hydrogen through a second reaction zone containing a particulate bed of hydrogenation catalyst at an elevated temperature and pressure to produce a substantially completely saturated aromatic product.

2. The process of claim 1 in which the aromatic hydrocarbon is benzene.

3. The process of claim 1 in which the film of hydrogenation catalyst comprises rhodium.

4. The process of claim 1 in which the film of hydrogenation catalyst comprises nickel and molybdenum.

5. The process of claim 1 in which the film of hydrogenation catalyst comprises nickel and tungsten.

6. The process of claim 1 in which the catalyst in the particulate bed comprises nickel oxide.

7. The process of claim 1 in which the entire effluent from the first reaction zone is passed through the second reaction zone.

8. A process for the hydrogenation of aromatic hydrocarbons which comprises passing a mixture comprising an aromatic hydrocarbon and a stoichiometric excess of hydrogen at an elevated temperature and pressure through an elongated tubular first reaction zone having a metal oxide coating produced artificially on the inner walls of said first reaction zone, said oxide serving as the support for a film of hydrogenation catalyst to produce a partially hydrogenated intermediate reaction product and passing at least a portion of said intermediate reaction product with excess hydrogen through a second reaction zone containing a bed of particulate hydrogenation catalyst at an elevated temperature and pressure to produce a substantially completely saturated aromatic product.

References Cited by the Examiner

UNITED STATES PATENTS

| | | | |
|---|---|---|---|
| 2,526,657 | 10/1950 | Guyer | 252—477 |
| 2,889,264 | 6/1959 | Spurlock | 208—143 |
| 2,890,162 | 6/1959 | Anderson et al. | 208—143 |
| 2,930,767 | 3/1960 | Novak | 252—477 |
| 2,953,612 | 9/1960 | Haxton et al. | 260—683.9 |
| 2,974,150 | 3/1961 | McClements et al. | 252—477 |
| 3,002,829 | 10/1961 | Kolfenback et al. | 260—683.9 |
| 3,077,733 | 2/1963 | Axe et al. | 260—667 |
| 3,146,187 | 8/1964 | Cabbage | 260—667 |

DELBERT E. GANTZ, *Primary Examiner.*

ALPHONSO D. SULLIVAN, *Examiner.*